(12) United States Patent
Notari et al.

(10) Patent No.: US 12,391,785 B2
(45) Date of Patent: Aug. 19, 2025

(54) LIPOPHYLIC COPOLYMERS COMPRISING POLAR MULTI-BLOCKS, PROCESS FOR THE PREPARATION THEREOF AND USE IN LUBRICATING COMPOSITIONS

(71) Applicant: ENI S.P.A., Rome (IT)

(72) Inventors: Marcello Notari, San Donato Milanese (IT); Riccardo Po', Novara (IT); Giulio Assanelli, San Donato Milanese (IT); Michele Laus, Alessandria (IT); Katia Sparnacci, Alessandria (IT)

(73) Assignee: ENI S.P.A., Rome (IT)

( * ) Notice: Subject to any disclaimer, the term of this patent is extended or adjusted under 35 U.S.C. 154(b) by 704 days.

(21) Appl. No.: 17/632,421

(22) PCT Filed: Jul. 29, 2020

(86) PCT No.: PCT/IB2020/057141
§ 371 (c)(1),
(2) Date: Feb. 2, 2022

(87) PCT Pub. No.: WO2021/024100
PCT Pub. Date: Feb. 11, 2021

(65) Prior Publication Data
US 2022/0298285 A1    Sep. 22, 2022

(30) Foreign Application Priority Data
Aug. 2, 2019  (IT) .................. 102019000013836

(51) Int. Cl.
*C08F 293/00*    (2006.01)
*C10M 145/14*    (2006.01)
(Continued)

(52) U.S. Cl.
CPC ....... *C08F 293/005* (2013.01); *C10M 145/14* (2013.01); *C08F 2438/03* (2013.01);
(Continued)

(58) Field of Classification Search
CPC ............. C08F 293/005; C10M 145/14; C10M 2209/084; C18F 2438/03; C10N 2020/02;
(Continued)

(56) References Cited

U.S. PATENT DOCUMENTS 3,544,991 A    12/1970   Tsubakimoto et al.
3,668,125 A    6/1972    Anderson
(Continued)

FOREIGN PATENT DOCUMENTS

EP    0578725 B1    6/1997
EP    0585269 B1    6/1998
(Continued)

OTHER PUBLICATIONS

Arnaud Favier et al., "Experimental Requirements for an Efficient Control of Free-Radical Polymerizations via the Reversible Addition-Fragmentation Chain Transfer (RAFT) Process", Macromolecular Rapid Communications, 2006, vol. 27, Issue 9, pp. 653-692.
(Continued)

*Primary Examiner* — Ling Siu Choi
*Assistant Examiner* — Olga Lucia Donahue
(74) *Attorney, Agent, or Firm* — CANTOR COLBURN LLP

(57) ABSTRACT

A lipophilic copolymer including polar multi-blocks having general formula (I):

$$[(B_yA_k)_s]_t(A_jC_m) \qquad (I)$$

Figure 1:
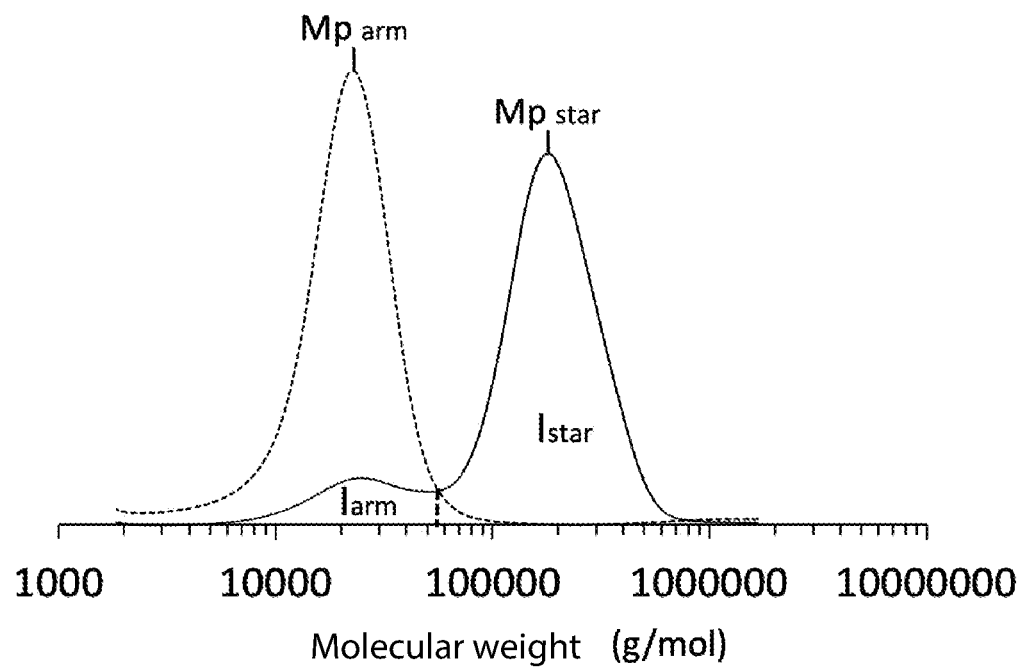

wherein:
B represents at least one monomer unit deriving from a lipophilic monomer having general formula (II):
(Continued)

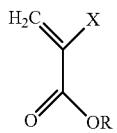

(II)

wherein:
  X represents a hydrogen atom; or a methyl group;
    R is selected from $C_1$-$C_{50}$ alkyl groups, linear or branched;
A represents at least one monomer unit deriving from a polar monomer selected from:
  (a) compounds having general formula (III):

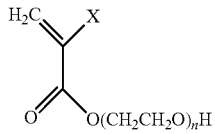

(III)

wherein X represents a hydrogen atom or a methyl group and n represents an integer comprised between 0 and 4;
  (b) (meth)acrylamide or (meth)acrylamides substituted on the nitrogen atom with one or two $C_1$-$C_4$ alkyl groups linear or branched;
  (c) di-($C_1$-$C_4$)-alkylamino-($C_1$-$C_4$)-alkyl (meth)acrylates;
C represents at least one monomer unit deriving from a polar polyfunctional monomer having general formula (IV):

$$Z\text{—}(W)_p \qquad \text{(IV)}$$

wherein:
  Z represents a group containing carbon, hydrogen and, optionally, oxygen; and
  W represents a function able to react covalently with an alkyl radical.

6 Claims, 2 Drawing Sheets

(51) Int. Cl.
  *C10N 20/00*   (2006.01)
  *C10N 20/02*   (2006.01)
  *C10N 20/04*   (2006.01)
  *C10N 30/00*   (2006.01)
  *C10N 30/02*   (2006.01)
(52) U.S. Cl.
  CPC ... *C10M 2209/084* (2013.01); *C10N 2020/02* (2013.01); *C10N 2020/04* (2013.01); *C10N 2020/073* (2020.05); *C10N 2030/02* (2013.01); *C10N 2030/68* (2020.05)
(58) Field of Classification Search
  CPC ............ C10N 2030/02; C10N 2030/68; C10N 2020/04; C10N 2020/073
  See application file for complete search history.

(56) References Cited

U.S. PATENT DOCUMENTS

| | | |
|---|---|---|
| 3,755,329 A | 8/1973 | Vaughan |
| 3,772,196 A | 11/1973 | St. Clair et al. |
| 3,853,053 A | 12/1974 | Grunewald |
| 2006/0189490 A1 | 8/2006 | Dardin et al. |
| 2013/0310291 A1* | 11/2013 | Baum ................. C08F 293/005 508/471 |

FOREIGN PATENT DOCUMENTS

| | | |
|---|---|---|
| EP | 1411070 A1 | 4/2004 |
| EP | 2292668 A1 | 3/2011 |
| EP | 2885328 B1 | 5/2019 |
| WO | 2004094356 A1 | 11/2004 |
| WO | 2006047398 A2 | 5/2006 |

OTHER PUBLICATIONS

C. Farcet et al., "Polystyrene-block-poly(butyl acrylate) and polystyreneblock-poly[(butyl acrylate)-co-styrene] block copolymers prepared via controlled free-radical miniemulsion polymerization using degenerative iodine transfer", Macromolecular Rapid Communications, 2000, vol. 21, p. 921-926.
Craig J. Hawker et al., "New Polymer Synthesis by Nitroxide Mediated Living Radical Polymerizations", Chemical Reviews, 2001, vol. 101, No. 12, p. 3661-3688.
Efrosyni Themistou et al., "Synthesis and characterization of amphiphilic star copolymers of 2-(dimethylamino)ethyl methacrylate and methyl methacrylate: Effects of architecture and composition", European Polymer Journal, ScienceDirect, 2007, vol. 43, No. 1, pp. 84-92.
Francoise Candau et al., "Hydrophobically-modified polyacrylamides prepared by micellar polymerization", Advances in Colloid and Interface Science, 1999, vol. 79, pp. 149-172.
Graeme Moad et al., "Living Radical Polymerization by the RAFT Process—A Third Update", Australian Journal of Chemistry, 2012, vol. 65, No. 8, p. 985-1076.
International Search Report issued Oct. 15, 2020 re: Application No. PCT/IB2020/057141, pp. 1-4, citing: US 2006/189490 A1, Themistou et al. "Synthesis and characterization . . . ", EP 1 411 070 A1 and WO 2006/047398 A2.
Junji Furukawa et al., "Copolymerization of butadiene-1,3 with acrylonitrile by an AlEtCl2 • AN/VOCl3 catalyst system", Journal of Polymer Science: Part B: Polymer Letters, 1969, vol. 7, p. 47-49.
Junji Furukawa et al., "New Information on the Alternating Copolymerization of Butadiene-1,3 with Acrylonitrile", Journal of Polymer Science: Part A-1: Polymer Chemistry, 1970, vol. 8, p. 1147-1163.
Krzysztof Matyjaszewski et al., "Atom Transfer Radical Polymerization", Chemical Reviews, 2001, vol. 101, No. 9, pp. 2921-2990.
Leslie R. Rudnick, "Lubricant Additives, Chemistry and Applications, Second Edition", Chemical Industries a Series of Reference Books and Textbooks, CRC Press, Taylor & Francis Group, LLC., 2009, pp. 315-338.
Michael J. Monteiro, "Design Strategies for Controlling the Molecular Weight and Rate Using Reversible Addition—Fragmentation Chain Transfer Mediated Living Radical Polymerization", Journal of Polymer Science: Part A: Polymer Chemistry, 2005, vol. 43, p. 3189-3204.
Nicolay V. Tsarevsky et al., ""Green" Atom Transfer Radical Polymerization: From Process Design to Preparation of Well-Defined Environmentally Friendly Polymeric Materials", Chemical Reviews, 2007, vol. 107, No. 6, p. 2270-2299.
Norman G. Gaylord et al., "Donor-Acceptor Complexes in Copolymerization. I. Preparation of Styrene-Acrylonitrile Alternating Copolymers in the Presence of Zinc Chloride", J. Polym. Sci., Part B, Macromolecules, 1969, vol. 2, No. 4, p. 442-443.
Takayuki Otsu, "Iniferter Concept and Living Radical Polymerization", Journal of Polymer Science: Part A: Polymer Chemistry, 2000, vol. 38, p. 2121-2136.

(56) References Cited

OTHER PUBLICATIONS

Written Opinion issued Oct. 15, 2020 re: Application No. PCT/IB2020/057141, pp. 1-5, citing: US 2006/0189490 A1, Themistou et al. "Synthesis and characterization . . . ", EP 1 411 070 A1 and WO 2006/047398 A2.

* cited by examiner

LIPOPHYLIC COPOLYMERS COMPRISING POLAR MULTI-BLOCKS, PROCESS FOR THE PREPARATION THEREOF AND USE IN LUBRICATING COMPOSITIONS

TECHNICAL FIELD

The present disclosure relates to a lipophilic copolymer comprising polar multi-blocks.

More particularly, the present disclosure relates to a lipophilic copolymer comprising polar multi-blocks having the specific general formula (I) reported below.

The present disclosure also relates to a process for the preparation of said lipophilic copolymer comprising polar multi-blocks.

Said lipophilic copolymer comprising polar multi-blocks can be advantageously used as an additive capable of improving the viscosity index in lubricating compositions comprising, for example, hydraulic oils, transmission oils, motor oils. In particular, said lipophilic copolymer comprising polar multi-blocks, can be advantageously used in lubricating compositions comprising hydraulic oils or transmission oils. More particularly, said lipophilic copolymer comprising polar multi-blocks, can be advantageously used in lubricating compositions comprising hydraulic oils or transmission oils, thanks to its good thickening capacity, excellent mechanical stability and excellent properties at low temperature.

Accordingly, the present disclosure provides a lubricating composition comprising at least one lipophilic copolymer comprising polar multi-blocks.

BACKGROUND

Processes for the (co)polymerization of different monomers are known in the art.

For example, the classical radical (co)polymerization is a known technique from the beginning of the 1900s which allows to obtain (co)polymers of a variety of unsaturated monomers. The main (co)polymers obtained by radical (co)polymerization can include, for example, low density polyethylene, polystyrene, poly(methyl methacrylate), polyacrylonitrile, styrene-acrylonitrile copolymer, polyvinyl chloride. The world market for said (co)polymers currently reaches one hundred million tons per year.

The classical radical (co)polymerization, however, has some limitations deriving from the mechanism of the (co)polymerization reaction, which does not allow to obtain complex and/or controlled macromolecular architectures. In fact, the possibility of preparing statistical or alternate copolymers is established by the electronic nature of the co-monomers used and cannot be easily directed according to one's wishes. Furthermore, classical radical (co)polymerization is not capable of producing block copolymers. In fact, there are only a few cases in which classical radical (co)polymerization can be used in order to obtain structures other than those determined by the reactivity ratios, which in turn are determined, as mentioned above, by the chemical-physical characteristics of the co-monomers used.

For example, in the case of the copolymerization of acrylonitrile with styrene, the classical radical copolymerization allows to obtain substantially statistical or alternate copolymers, only by adding to the polymerization mixture appropriate Lewis acids such as, for example, zinc chloride, vanadyl chloride, aluminum alkyl halides as described, for example, in: Furukawa J. and others, "*Journal of Polymer Science: Part B: Polymer Letters*" (1969), Vol. 7, p. 47-49; Furukawa J. and others, "*Journal of Polymer Science: Part A: Polymer Chemistry*" (1970), Vol. 8, Issue 5, p. 1147-1163; Gaylord N. G. and others, "*Macromolecules* (1969), Vol. 2(4), p. 442-443.

In more recent times, controlled or "living" radical (co)polymerization techniques have been developed, which have made it possible to prepare (co)polymers with more complex architectures, typical of the anionic (co)polymerization. The process mechanism, based on the addition of a suitable control agent to the (co)polymerization mixture, entails a very rapid decrease of the initiating species and an almost constant concentration of the propagating species, whose half-life times are comparable to those of the duration of the (co)polymerization reaction. The control agent prevents, or in any case limits, the occurrence of termination reactions and the "death" of the polymer chains (hence the definition of "living"). The advantages of the aforesaid controlled or "living" radical (co)polymerization are represented by the possibility of obtaining block (co)polymers, by adding, at the end of the first (co)polymerization phase, a second monomer other than the first one, or (co)polymers with a star or radial structure, by adding, at the end of the (co)polymerization, a polyfunctional unsaturated compound with suitable chemical structure.

Examples of controlled or "living" radical (co)polymerization are as follows:
"NMRP" (co)polymerization ("Nitroxide Mediated Radical Polymerization") described, for example, in Hawker C. J. and others, "*Chemical Reviews*" (2001), Vol. 101(12), p. 3661-3688;
"ATRP" (co)polymerization ("Atom Transfer Radical Polymerization") described, for example, in Matyjaszewski and others, "*Chemical Reviews*" (2001), Vol. 101(9), p. 2921-2990; Tsarevsky N. V. and others, "*Chemical Reviews*" (2007), Vol. 107(6), p. 2270-2299;
RAFT (co)polymerization ("Reversible Addition Fragmentation Chain Transfer Polymerization") described, for example, in Monteiro M. J., "*Journal of Polymer Science: Part A: Polymer Chemistry*" (2005), Vol. 43, p. 3189-3204; Favier A. and others, "*Macromolecular Rapid Communications*" (2006), Vol. 27, Issue 9, p. 653-692; Moad G. and others, "*Australian Journal of Chemistry*" (2012), Vol. 65(8), p. 985-1076;
(co)polymerization via "iniferter" described, for example, in Otsu T., "*Journal of Polymer Science: Part A: Polymer Chemistry*" (2000), Vol. 38, p. 2121-2136;
"ITP" (co)polymerization ("Iodine-Transfer Polymerization") described, for example, in the international patent application WO 2004/094356; Farcet C. and others, "*Macromolecular Rapid Communications*." (2000), Vol. 21, p. 921-926.

It is also known that radical (co)polymerizations of industrial relevance, that are controlled or "living" and not, can be carried out by various processes such as, for example, (co)polymerization in solution, in bulk, in emulsion, in suspension. In the (co)polymerization in solution and in bulk the initiator and the monomers are mixed and the reaction is carried out in a homogeneous medium. On the contrary, both the (co)polymerization in emulsion and the (co)polymerization in suspension, provides for the segregation of the monomers and the (co)polymerization thereof in a heterogeneous system in which the monomers are dispersed in aqueous medium inside the micelles obtained by the addition or on-site creation of surfactants [(co)polymerization in emulsion], or in micro-drops obtained by vigorous mixing of the system, stabilized by the addition of stabilizing agents which by placing themselves at the interface with the aqueous matrix allow to control and slow down the aggregation of the micro-drops.

The advantages of the segregation of the monomers are various and range from the better dissipation of the reaction heat, to a control on the molecular weights which is very different from what is obtained with the reaction carried out in a homogeneous medium.

For example, segregation was used to synthesise hydrophilic polymers comprising multi-blocks of lipophilic units, obtained by micellar polymerization as described, for example, in Candau F. and others, "*Advances in Colloid and Interface Science*" (1999), Vol. 79, p. 149-172. Specifically, the hydrophilic monomer is dissolved in water and a small percentage of a hydrophobic monomer, insoluble in water, and a suitable surfactant are added to the solution. The suspension is polymerized by adding a radical initiator (a peroxide or a diazocompound) and heating the whole to suitable temperatures.

It is known that the viscosity of lubricating oils varies with temperature. Many lubricating oils must in fact be used in a wide temperature range and therefore it is important that the oil is not too viscous at low temperature and is not too fluid at high temperature. The change in the viscosity of a lubricating oil with temperature is expressed by the value of the viscosity index: the higher the value of said index, the lower the change in the viscosity of the lubricating oil with temperature.

The use of additives based on (co)polymers capable of increasing the viscosity index of the lubricating oils, increasing their viscosity at high temperature and limiting as much as possible the increase in viscosity at low temperature is also known. (Co)polymers usually used to improve the viscosity index are, for example: ethylene/propylene copolymers, hydrogenated conjugated polydienes (e.g., hydrogenated polyisoprene), hydrogenated styrene/butadiene copolymers, poly-alkyl (meth)acrylates. The synthesis and the use in the lubricating oils of hydrogenated linear polymers of conjugated dienes and of styrene-dienes conjugated copolymers are described, for example, in American patents U.S. Pat. Nos. 3,544,911, 3,668,125, 3,772,196, 3,755,329, 3,853,053, as well as European patents EP 585 269, EP 578 725. The synthesis and the use of linear poly-alkyl (meth) acrylates derived from (co)polymerization, controlled or "living" and not, of alkyl (meth)acrylic monomers with different length of the alkyl chain, are described, for example, in "*Lubricant Additives, Chemistry and Applications*" (2009), 2nd Edition, Rudnick L. R. Ed.; CRC Press, Taylor & Francis Group, LLC., p. 315-338.

For each of the aforesaid classes of (co)polymers, as the molecular weight of said (co)polymers increases, there is an increase in the thickening power and therefore the amount of (co)polymer necessary to obtain a certain increase in the high temperature viscosity of the lubricating oil (thickening) is reduced. To be a good additive that improves the viscosity index, a (co)polymer must have not only a beneficial influence on the viscosity index of the fresh lubricating oil, but it must also be stable over time and maintain its function also when the lubricating oil is in operation. For this reason, a good additive must also be stable to mechanical shear. It is known that the mechanical shear stability of a (co)polymer decreases when its molecular weight increases and therefore the choice of an additive that improves the viscosity index is usually a compromise between the use of high amounts of low molecular weight (co)polymers stable to mechanical shear and the use of small amounts of high molecular weight (co)polymers that are poorly stable to mechanical shear.

To improve the mechanical shear stability of the aforesaid (co)polymers and, in particular of the poly-(meth)acrylates, while maintaining their thickening capacity of the lubricating oil, (co)polymers have been made with particular structures, such as (co)polymers with star structure. The obtainment of such (co)polymeric structures is possible by using controlled radical (co)polymerization techniques, such as RAFT (co)polymerization ("Reversible Addition Fragmentation Chain Transfer Polymerization").

For example, the international patent application WO 2006/047398 describes a composition comprising:
(a) a star structure polymer obtained by a controlled radical polymerization process, said polymer comprising: (i) a central nucleus ("core") comprising a monomer, or an oligomer, or a polyvalent (meth)acrylic polymer, or a monomer, or an oligomer, or a polyvalent divinyl non-acrylic polymer; and (ii) at least two polymeric arms deriving from the polymerization of alkyl (meth)acrylates; and
(b) a lubricating oil;
wherein said central nucleus ("core") furthermore comprises a functional group having formula (I):

wherein:
R$^1$ is hydrogen, or an alkyl group, linear or branched, containing from 1 to 5 carbon atoms;
A is nitrogen or oxygen; and
Y is a free radical selected from the group consisting of one or more atoms or groups of atoms which can be transferred via a radical mechanism under polymerization conditions, a halogen, a group —O=N and a group —SC(=S)—

European patent application EP 2 292 668 describes a process for the preparation of a polymer, comprising the stages of:
(1) contacting (i) a radical initiator, (ii) a chain transfer agent containing a thiocarbonyl-thio group and a free radical group; and (iii) one or more radically polymerizable monomers so as to obtain a linear block copolymer in which the polymerizable monomers are alkyl (meth) acrylic monomers,
wherein the process of stage (1) is a controlled radical polymerization process with living characteristics; and at least about 50% of the polymeric chains obtained in stage (1) contain a reactive terminal group able to react with a polyvalent coupling agent; and optionally stage (2) and/or stage (3):
(2) contacting the polymer obtained in stage (1) with a polyvalent coupling agent obtaining a star structure polymer, wherein the star structure polymer is a "block-arm" star polymer; and
(3) contacting the polymer obtained in stage (1) or stage (2) with a polymerization inhibitor.

The aforesaid patent application also describes a lubricating composition comprising (a) a star structure polymer obtained from the aforesaid process and (b) a lubricating oil.

Patent application EP 2 885 328 describes a star structure polymer comprising a central core and at least three arms, wherein the central core of the star structure polymer comprises a network of crosslinked polymers deriving from a mixture of monomers comprising:
(a) one or more multi-functional monomers [e.g., polyvalent unsaturated (meth)acrylic monomers]; and
(b) one or more mono-functional monomers [e.g., monomers deriving from saturated alcohols such as alkyl (meth)acrylates];

wherein the arms of said star structure polymer derive from a mixture of polymers comprising precursors of said arms formed by (i) one or more mono-functional monomers, wherein said precursors include at least one reactive terminal group.

The aforesaid patent application also describes various processes for the production of said star structure polymer such as, for example, "ATRP" (co)polymerization ("Atom Transfer Radical Polymerization") and RAFT (co)polymerization ("Reversible Addition Fragmentation Chain Transfer Polymerization"). Finally, the aforesaid patent application describes a lubricating composition comprising a lubricating oil and the star structure polymer described above.

However, the processes described above do not allow to obtain lipophilic copolymers comprising polar multi-blocks. The fundamental difficulty consists, in fact, both in the impossibility of making the two monomers (lipophilic and polar) coexist which are highly incompatible and which would lead to the formation of copolymers that are not mutually soluble, and in the impossibility of having reactions capable of controlling the length of the chains obtained from the single monomers and, more generally, of controlling the macromolecular architecture of the copolymers to be obtained.

SUMMARY

The Applicant has therefore posed the problem of finding lipophilic copolymers comprising polar multi-blocks, as well as a process for the preparation thereof.

The Applicant has now found that it is possible to obtain lipophilic copolymers comprising polar multi-blocks by means of RAFT copolymerization ("Reversible Addition Fragmentation Chain Transfer Polymerization") comprising contacting, in the presence of at least one polar organic solvent and at least one surfactant, at least one lipophilic monomer and at least one polar monomer, optionally polyfunctional, said surfactant having the function of segregating said at least one polar monomer inside the reaction mixture. The segregation of said at least one polar monomer in a lipophilic environment, combined with said RAFT copolymerization, allows the controlled growth of lipophilic copolymers comprising polar multi-blocks. Furthermore, in the case in which at least one polyfunctional polar monomer is used, said polyfunctional polar monomer acts as a branching centre allowing to obtain lipophilic copolymers comprising star structure polar multi-blocks. Said lipophilic copolymers comprising polar multi-blocks can be advantageously used as additives capable of improving the viscosity index in lubricating compositions comprising, for example, hydraulic oils, transmission oils, motor oils. In particular, said lipophilic copolymers comprising polar multi-blocks can be advantageously used in lubricating compositions comprising hydraulic oils or transmission oils. More particularly, said lipophilic copolymers comprising polar multi-blocks can be advantageously used in lubricating compositions comprising hydraulic oils or transmission oils, thanks to their good thickening capacity, excellent mechanical stability and excellent low temperature properties.

Therefore, the present disclosure provides a lipophilic copolymer comprising polar multi-blocks having general formula (I):

$$[(B_yA_k)_s]_t(A_jC_m) \quad (I)$$

wherein:
B represents at least one monomer unit deriving from a lipophilic monomer having general formula (II):

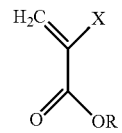

(II)

wherein:
X represents a hydrogen atom; or a methyl group;
R is selected from $C_1$-$C_{50}$ alkyl groups, preferably $C_1$-$C_{30}$, linear or branched;
A represents at least one monomer unit deriving from a polar monomer selected from:
(a) compounds having general formula (III):

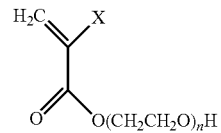

(III)

wherein X represents a hydrogen atom or a methyl group and n represents an integer comprised between 0 and 4, preferably comprised between 1 and 2;
(b) (meth)acrylamide or (meth)acrylamides substituted on the nitrogen atom with one or two $C_1$-$C_4$ alkyl groups, preferably $C_1$-$C_2$, linear or branched, said alkyl groups optionally containing polar functional groups;
(c) di-($C_1$-$C_4$)-alkylamino-($C_1$-$C_4$)-alkyl (meth)acrylates, preferably di-($C_1$-$C_2$)-alkylamino-($C_1$-$C_2$)-alkyl (meth)acrylates;
C represents at least one monomer unit deriving from a polar polyfunctional monomer having general formula (IV):

$$Z-(W)_p \quad (IV)$$

wherein:
Z represents a group containing carbon, hydrogen and, optionally, oxygen;
W represents a function able to react covalently with an alkyl radical;
p is an integer or fractional number comprised between 2 and 8, preferably comprised between 3 and 5;
y is an integer or fractional number comprised between 2 and 250, preferably comprised between 2 and 80;
k is an integer or fractional number comprised between 0 and 90, preferably comprised between 0 and 30;
j is an integer or fractional number comprised between 0 and 80, preferably comprised between 5 and 30;
m is an integer or fractional number comprised between 0 and 10, preferably comprised between 2 and 8;
s is an integer or fractional number comprised between 1 and 20, preferably comprised between 3 and 15;
t is an integer or fractional number comprised between 3 and 20, preferably comprised between 3 and 15;
provided that at least one between j and k is different from 0.

For the purpose of this description and the following claims, the term "star structure copolymer(s)" is to be intended having the same meaning as "radial structure copolymer(s)".

For the purpose of the present description and the following claims, the definitions of the numerical intervals always comprise the extreme values unless otherwise specified.

For the purpose of the present description and the following claims, the term "comprising" also includes the terms "which essentially consists of" or "which consists of".

In accordance with a preferred embodiment of the present disclosure, in said general formula (I):
B represents at least one monomer unit deriving from a lipophilic monomer having general formula (II) selected from: methyl methacrylate (X=CH$_3$ and R=CH$_3$), medium-chain alkyl methacrylates (X=CH$_3$ and R=C$_{12}$H$_{25}$—C$_{15}$H$_{31}$); long-chain alkyl methacrylates (X=CH$_3$ and R=C$_{16}$H$_{33}$—C$_{18}$H$_{37}$), longer-chain alkyl methacrylates (X=CH$_3$ and R=C$_{18}$H$_{37}$—C$_{22}$H$_{45}$); or mixtures thereof.

In accordance with a preferred embodiment of the present disclosure, in said general formula (I):
A represents at least one monomer unit deriving from a polar monomer selected from:
(a) compounds having general formula (III) selected from: acrylic acid (X=H and n=0), methacrylic acid (X=CH$_3$ and n=0), hydroxyethyl acrylate (X=H and n=1), hydroxyethyl methacrylate (X=CH$_3$, n=1); or mixtures thereof;
(b) acrylamide, methacrylamide, N-iso-propyl-acrylamide, 2-hydroxypropyl methacrylamide, N-[3-(dimethyl-amino)-propyl]-methacrylamide, or mixtures thereof;
(c) 2-(dimethyl-amino)-ethyl methacrylate, 2-(diethyl-amino)-ethyl methacrylate, 2-(dimethyl-amino)-ethyl acrylate, or mixtures thereof.

In accordance with a preferred embodiment of the present disclosure, in said general formula (I):
C represents at least one monomer unit deriving from a polar polyfunctional monomer selected from:
(a') polyvalent methacrylic monomers having general formula (V)

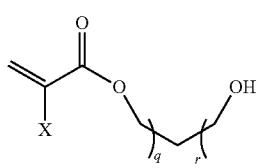

(V)

wherein q+r=4, q>1, r<3, and X represents a hydrogen atom or a methyl group;
(b') polyethylene glycols di-(meth)acrylates having general formula (VI):

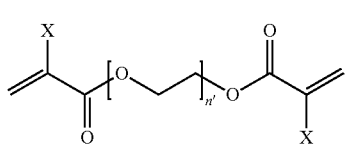

(VI)

wherein n' is an integer comprised between 1 and 10, preferably comprised between 1 and 3, and X represents a hydrogen atom or a methyl group;

(c') polyfunctional acrylamides having general formula (VII):

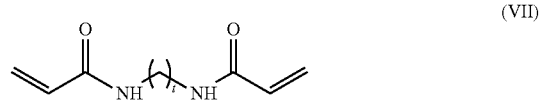

(VII)

wherein t is an integer comprised between 1 and 4, preferably comprised between 1 and 2;
(d') calixarenes having general formula (VII):

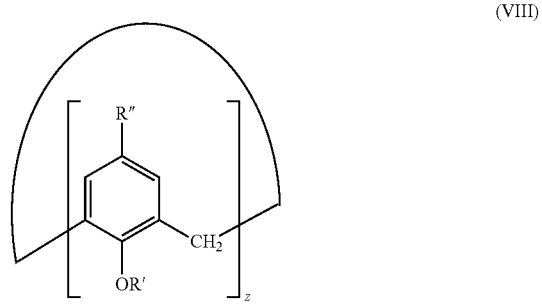

(VIII)

wherein R' represents a group having formula (VIIIa):

(VIIIa)

wherein X represents a hydrogen atom or a methyl group and R" represents a hydrogen atom, or is selected from C$_1$-C$_{40}$ alkyl groups, preferably C$_4$-C$_{24}$, linear or branched, z is an integer comprised between 4 and 16, preferably comprised between 4 and 12;
(e') 2,2'-bis-[4-(methacryloxy-polyethoxy)-phenyl]-propanes having general formula (IX):

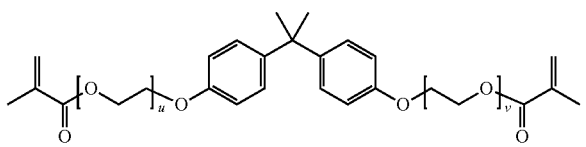

(IX)

wherein u and v are an integer comprised between 1 and 10, preferably comprised between 3 and 6.

In accordance with a particularly preferred embodiment of the present disclosure, in said general formula (I):
C represents at least one monomer unit deriving from a polar polyfunctional monomer selected from:
(a') polyvalent methacrylic monomers having general formula (V) selected from: pentaerythritol tetra-acrylate (q=4; r=0), pentaerythritol tri-acrylate (q=3; r=1);

(b') polyethylene glycol di-(meth)acrylate [n=1 in the general formula (VI)];
(c') N,N'-methylene-bis-acrylamide [t=1 in the general formula (VII)];
(d') calixarenes having general formula (VIII) wherein R' represents a group having formula (VIIIa):

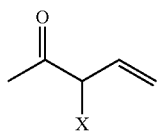

(VIIIa)

wherein X represents a methyl group and R" is selected from $C_8$-Cis alkyl group, linear or branched, z is an integer comprised between 4 and 8;
(e') 2,2'-bis-[4-(methacryloxy-polyethoxy)-phenyl]-propane [u+v=10 in the general formula (IX)].

In accordance with a particularly preferred embodiment of the present disclosure, in said general formula (I):
B represents at least one monomer unit deriving from methyl methacrylate, at least one monomer unit deriving from dodecyl methacrylate and at least one monomer unit deriving from octadecyl methacrylate, with a random or block structure;
A represents at least one monomer unit deriving from 2-hydroxymethyl methacrylate;
C represents at least one monomer unit deriving from pentaerythritol tetraacrylate, or at least one monomer unit deriving from N,N'-bis-methylene-bis-acrylamide; or at least one monomer unit deriving from 2,2'-bis[4-(methacryloxy-polyethoxy)-phenyl]-propane [u+v=10 in the general formula (IX)];
the values of y, k, j m, s and t, depending on the amount and type of monomers used, as well as the process used to obtain the lipophilic copolymer comprising polar multi-blocks having general formula (I) object of the present disclosure, at least one between j and k being different from 0.

As reported above, the present disclosure also relates to a process for the preparation of the lipophilic copolymer comprising polar multi-blocks having general formula (I).

The present disclosure therefore provides a process for the preparation of a lipophilic copolymer comprising polar multi-blocks having general formula (I) through RAFT-type copolymerization ("Reversible Addition Fragmentation Chain Transfer Polymerization") comprising contacting, in the presence of at least one apolar organic solvent, the following compounds:
(i) at least one lipophilic monomer having general formula (II);
(ii) at least one polar monomer selected from: (a) compounds having general formula (III), (b) (meth)acrylamides optionally substituted on the nitrogen atom with one or two $C_1$-$C_4$ alkyl groups, preferably $C_1$-$C_2$, linear or branched, (c) di-($C_1$-$C_4$)-alkylamino-($C_1$-$C_4$)-alkyl (meth)acrylates, preferably di-($C_1$-$C_2$)-alkylamino-($C_1$-$C_2$)-alkyl (meth)acrylates;
(iii) at least one surfactant;
(iv) optionally, at least one polar polyfunctional monomer selected from: (a') polyvalent methacrylic monomers having general formula (V); (b') polyethylene glycols di-(meth)acrylates having general formula (VI); (c') polyfunctional acrylamides having general formula (VII); (d') calixarenes having general formula (VIII);
(e') 2,2'-bis-[4-(methacryloxy-polyethoxy)-phenyl]-propanes having general formula (IX);
(v) at least one chain transfer agent of the RAFT thiocarbonyl thio type ("Reversible Addition Fragmentation Chain Transfer Polymerization");
(vi) at least one radical polymerization initiator.

In accordance with a preferred embodiment of the present disclosure, in said process the apolar organic solvent can be selected, for example, from: saturated aliphatic hydrocarbons having a number of carbon atoms greater than or equal to 7 such as, for example, heptane, octane; aromatic hydrocarbons such as, for example, toluene, xylene; lubricating base oils or mixtures thereof; it is preferably selected from lubricating base oils or mixtures thereof.

In accordance with a particularly preferred embodiment of the present disclosure, said process can be carried out in the presence of at least one lubricating base oil, said lubricating base oil being present at a concentration, expressed in weight percentage of lubricating base oil with respect to the total weight of the reaction mixture, comprised between 10% by weight and 90% by weight, preferably comprised between 25% by weight and 75% by weight.

For the purpose of the present description and the following claims, the term "reaction mixture" means the mixture of the compounds (i)-(vi) including said at least one apolar organic solvent.

It should be noted that, in the case in which a lubricating base oil is used, at the end of the process object of the present disclosure, a solution of the lipophilic copolymer comprising polar multi-blocks having general formula (I) is obtained in said lubricating base oil, which solution can therefore be used as it is as an additive for the preparation of lubricating compositions.

In accordance with a preferred embodiment of the present disclosure, said lubricating base oil can be selected, for example, from lubricating base oils of mineral origin, of synthetic origin, of vegetable origin, of animal origin, or mixtures thereof.

Lubricating base oils of mineral origin derive from well-known oil refining processes such as, for example, distillation, deparaffinization, deasphalting, dearomatization, hydrogenation.

Lubricating base oils of synthetic origin can be selected, preferably, from: hydrocarbon oils such as, for example, polymerized and hydrogenated terminal or internal olefins; alkylbenzenes; polyphenyls; alkylated diphenylethers; polyalkylene glycols and derivatives thereof, wherein the terminal hydroxyl groups have been modified, for example, by esterification or etherification.

Alternatively, the lubricating base oils of synthetic origin can be selected, for example, from: esters of synthetic carboxylic acids or of animal or vegetable derivation with a variety of alcohols or polyols; preferably from esters of carbonic acid with a variety of alcohols and polyols.

Lubricating base oils of vegetable origin can be selected, for example, from: soybean oil, palm oil, castor oil, or mixtures thereof.

Lubricating base oils of animal origin can be selected, for example, from: tallow oil, lard oil, whale oil, or mixtures thereof.

A further way of classifying lubricating base oils is the one defined by the American Petroleum Institute (API) in the publication "Engine Oil Licensing and Certification System" (API EOLCS, 1507—Industry Services Department, Fourteenth Edition, December 1996, Addendum 1, December 1998).

In accordance with the aforesaid classification method, the lubricating base oils are subdivided into five groups according to their chemical-physical and compositional characteristics. The lubricating base oils that can be used in the process object of this disclosure must preferably have a low content of organic sulfur compounds, since the latter act as chain transfer agents, decreasing the control capacity of the molecular weights, thus leading to a increase in the polydispersity of the obtained lipophilic copolymer comprising polar multi-blocks having the general formula (I).

In accordance with the aforesaid classification method (API), the lubricating base oils that can be used in the process in accordance with the present disclosure, are those belonging to all Groups I, II, III, IV and V, more preferably to Groups II, III and IV, more preferably to Group III. An example of a lubricating base oil belonging to Group III is the product commercially known under the name of ETRO 4 by Petronas.

In accordance with a preferred embodiment of the present disclosure, in said process the lipophilic monomer (i) can be used in an amount, expressed as a percentage by weight with respect to the total weight of the reaction mixture, comprised between 10% by weight and 90% by weight, more preferably comprised between 20% by weight and 70% by weight.

In accordance with a preferred embodiment of the present disclosure, in said process the polar monomer (ii) can be used in an amount, expressed as a percentage by weight with respect to the total weight of the reaction mixture, comprised between 0.5% by weight and 15% by weight, preferably comprised between 1% by weight and 8% by weight It should be noted that the use of the surfactant (iii) in the process object of this disclosure has the function of segregating the polar monomer(s) (ii), optionally polyfunctional (iv), making it/them available for the polymerization reaction with the lipophilic polymer which grows in a controlled manner in the apolar phase and which comprises the lipophilic monomer(s).

In accordance with a preferred embodiment of the present disclosure, in said process the surfactant (iii) can be selected, for example, from: non-ionic surfactants such as, for example, surfactants containing polyethoxylated hydrophilic chains linked to a hydrocarbon group (e.g., 4-tert-octyl phenol polyethoxylate commercially known under the name of Triton® X-100 by Dow Chemical Company); surfactants containing block copolymers polyethylene oxide-polypropylene oxide (e.g., products commercially known under the name of Pluronic® by BASF or Tergitol® by Dow Chemical Company); surfactants containing alkyl esters of sorbitan (e.g., products commercially known under the name of Span® by Croda International PLC); ionic surfactants containing calcium or sodium alkyl benzene sulphonates (e.g., calcium dialkyl benzene sulfonate commercially known as Eni MX 3280 by Eni); preferably from non-ionic surfactants or from ionic surfactants, still more preferably from non-ionic surfactants.

In accordance with a preferred embodiment of the present disclosure, in said process the surfactant (iii) can be used in an amount, expressed as a percentage by weight with respect to the total weight of the reaction mixture, comprised between 0.2% by weight and 10% by weight, preferably comprised between 0.5% by weight and 4% by weight.

In accordance with a preferred embodiment of the present disclosure, in said process the polar polyfunctional monomer (iv) can be used in an amount, expressed as a percentage by weight with respect to the total weight of the reaction mixture, comprised between 0.1% by weight and 5% by weight, preferably comprised between 0.2% by weight and 2% by weight.

In accordance with a preferred embodiment of the present disclosure, in said process the radical polymerization initiator (vi) can be selected, for example, from: azo compounds such as, for example, 2,2' azobis(iso-butyronitrile) (AIBN), 2,2'-azobis(2-methyl-butyrronitrile) (AMBN), 1,1-azobis(cyclohexane-1-carbonitrile), 2,2'-azobis(2,4-dimethyl-valeronitrile), or mixtures thereof; peroxides or hydroperoxides such as benzoyl peroxide, tert-butyl perbenzoate, tert-butyl peroxide, tert-butyl hydroperoxide, tert-butyl peroctoate, or mixtures thereof; or mixtures thereof. 2,2'-azobis (2-methyl-butyrronitrile) (AMBN) (commercially known under the name of VAZO™ 67 by DuPont) is preferred.

In accordance with a preferred embodiment of the present disclosure, in said process the radical polymerization initiator (vi) can be used in a molar amount, obtainable from the ratio between the mass of the monomers used in said process and the weight average molecular weight to be obtained ($M_w$ target) for the single polymeric arms of the lipophilic copolymer comprising polar multi-blocks having general formula (I), said ratio being obtained from the Formula (A) reported below:

$$moles_{Initiator} + moles_{RAFT} = \frac{grams_{monomers}}{Mw_{target}} \qquad \text{Formula (A)}$$

wherein:
  $grams_{monomers}$ is the mass in grams of the monomers (i) and (ii);
  $moles_{RAFT}$ is the number of moles of the chain transfer agent of the RAFT thiocarbonyl thio type ("Reversible Addition Fragmentation Chain Transfer Polymerization") (v);
  $moles_{Initiator}$ is the number of moles of initiator of radical polymerization (vi).

For the purpose of the present description and of the following claims, the term "polymeric arms" refers:
  to the polymeric chain of the lipophilic copolymer comprising polar multi-blocks having general formula (I) obtained in the absence of the polar polyfunctional monomer;
  to the polymeric arms of the lipophilic copolymer comprising polar multi-blocks having general formula (I) with a star structure obtained in the presence of the polyfunctional polar monomer.

In accordance with a preferred embodiment of the present disclosure, in said process the chain transfer agent of the RAFT thiocarbonyl thio type ("Reversible Addition Fragmentation Chain Transfer Polymerization") (v) can be selected, for example from: dithioesters; trithiocarbonates; xanthates; dithiocarbamates, or mixtures thereof.

Specific examples of chain transfer agents of the RAFT thiocarbonyl thio type ("Reversible Addition Fragmentation Chain Transfer Polymerization") that can be advantageously used in the process of the present disclosure are: benzyl dithiobenzoate, 2-cyano-2-propyl dithiobenzoate, α-cyano-benzyl dithiobenzoate, 2-cyano-2-propyl-dodecyl trithiocarbonate, 2-(dodecylthiocarbonothioylthio)-propionic acid, 2-cyanopropan-2-yl-N-methyl-N-(pyridin-4-yl)-carbamodithioate, or mixtures thereof. 2-Cyano-2-propyl dithiobenzoate, 2-cyano-2-propyl dodecyl trithiocarbonate are preferred.

In accordance with a preferred embodiment of the present disclosure, in said process the chain transfer agent of the thiocarbonyl thio RAFT type ("Reversible Addition Fragmentation Chain Transfer Polymerization") (v) can be used in a molar amount, obtainable from the ratio between the mass of the monomers used in said process and the weight average molecular weight to be obtained ($M_w$ target) for the single polymeric arms of the lipophilic copolymer comprising polar multi-blocks having general formula (I), said ratio being obtained from the Formula (A) reported above.

In accordance with a preferred embodiment of the present disclosure, in said process the chain transfer agent of the thiocarbonyl thio RAFT type ("Reversible Addition Fragmentation Chain Transfer Polymerization") (v) and the radical polymerization initiator (vi) can be used in a molar ratio comprised between 1 and 5, preferably comprised between 2 and 3.

The process object of the present disclosure can be carried out in two stages according to two different methodologies.

In accordance with a first preferred embodiment, the process object of the present disclosure can be carried out in two stages as reported in the following Scheme 1:

Scheme 1

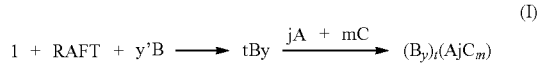

wherein I represents the radical polymerization initiator (vi), RAFT represents the chain transfer agent of the thiocarbonyl thio RAFT type ("Reversible Addition Fragmentation Chain Transfer Polymerization") (v), y, B, t, A, j, C and m, have the same meanings reported above in the definition of the general formula (I), k in said general formula (I) is 0, y'=t*y*s wherein s=1.

In accordance with a preferred embodiment, the process according to Scheme 1 comprises the following two stages:
($a_1$) dissolving in at least one apolar organic solvent, preferably a lubricating base oil, at least one lipophilic monomer having general formula (II) (i), at least one radical polymerization initiator (vi) and at least one chain transfer agent of the thiocarbonyl thio RAFT type ("Reversible Addition Fragmentation Chain Transfer Polymerization") (v), said stage ($a_1$) being carried out at a temperature comprised between 50° C. and 150° C., preferably comprised between 70° C. and 130° C., for a time comprised between 1 hour and 8 hours, preferably comprised between 1.5 hours and 5 hours;
($a_2$) adding to the solution obtained in the aforesaid stage ($a_1$), at least one polar monomer (ii), optionally, at least one polar polyfunctional monomer (iv), and at least one radical polymerization initiator (vi), previously emulsified in the same organic apolar solvent used in stage ($a_1$), using at least one surfactant (iii), said stage ($a_2$) being carried out at a temperature comprised between 50° C. and 150° C., preferably comprised between 70° C. and 130° C., for a time comprised between 1 hour and 6 hours, preferably comprised between 1 hour and 5 hours.

The aforesaid process according to Scheme 1, which comprises the two stages ($a_1$) and ($a_2$), leads to the obtainment of lipophilic copolymers comprising polar multi-blocks having general formula (I), wherein k=0, said lipophilic copolymers comprising polar multi-blocks having a star structure, with polymeric arms, in the case in which said at least one polar polyfunctional monomer (iv) is present.

The lipophilic copolymers obtained in stage ($a_1$) have the following characteristics:
weight average molecular weight ($M_w$) comprised between 1000 g/mol and 200000 g/mol, preferably comprised between 5000 g/mol and 50000 g/mol;
polydispersity index (PDI), corresponding to the ratio ($M_w/M_n$) between the weight average molecular weight ($M_w$) and the number average molecular weight ($M_n$), ($M_w/M_n$) lower than 1.5, preferably lower than 1.3.

The lipophilic copolymers comprising polar multi-blocks of general formula (I), having a star structure in the case in which said at least one polar polyfunctional monomer (iv), with polymeric arms and polar multi-blocks, obtained in stage ($a_2$) is present, have the following features:
weight average molecular weight ($M_w$) comprised between 15000 g/mol and 1000000 g/mol, preferably comprised between 100000 g/mol and 500000 g/mol;
polydispersity index (PDI), corresponding to the ratio ($M_w/M_n$) between the weight average molecular weight ($M_w$) and the number average molecular weight ($M_n$), lower than 1.7, preferably lower than 1.5;
average number of polymeric arms comprised between 4 and 20, preferably comprised between 7 and 15.

It should be noted that in the lipophilic copolymers comprising polar multi-blocks having a star structure of general formula (I) obtained in stage ($a_2$) the viscosity regularly increases as the amount of polar polyfunctional monomer (iv) present in said stage ($a_2$) increases.

In accordance with a further preferred embodiment, the process object of the present disclosure can be carried out in two stages as reported in the following Scheme 2:

Scheme 2

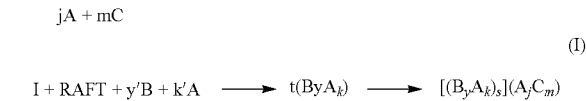

wherein I represents the radical polymerization initiator (vi), RAFT represents the chain transfer agent of the thiocarbonyl thio RAFT type ("Reversible Addition Fragmentation Chain Transfer Polymerization") (v), y, B, k, A, j, s, t and C, have the same meanings reported above in the definition of the general formula (I), y'=t*y*s and k'=k*t*s.

In accordance with a preferred embodiment, the process according to Scheme 2 comprises the following two stages:
($b_1$) dissolving in at least one apolar solvent, preferably a lubricating base oil, at least one lipophilic monomer having general formula (II) (i), at least one radical polymerization initiator (vi), at least one chain transfer agent of the thiocarbonyl thio RAFT type ("Reversible Addition Fragmentation Chain Transfer Polymerization") (v), an amount comprised between 30% by weight and 95% by weight, preferably comprised between 50% by weight and 80% by weight, of at least one polar monomer (ii) with respect to the total weight of said polar monomer (ii), and an amount comprised between 30% by weight and 95% by weight, preferably comprised between 50% by weight and 80% by weight, of at least one surfactant (iii), with respect to the total weight of said surfactant (iii), said stage ($b_1$) being carried out at a temperature comprised between 50° C. and 150° C., preferably comprised between 70° C. and 130° C., for a time comprised between 1 hour and 8 hours, preferably comprised between 2 hours and 5 hours;

($b_2$) adding to the solution obtained in the aforesaid stage ($b_1$), the remaining part of said at least one polar monomer (ii), optionally, at least one polar polyfunctional monomer (iv), and at least one radical polymerization initiator (vi), previously emulsified in the same organic apolar solvent used in stage ($b_1$), using at least the remaining part of said at least one surfactant, said stage ($b_2$) being carried out at a temperature comprised between 50° C. and 150° C., preferably comprised between 70° C. and 130° C., for a time comprised between 1 hour and 8 hours, preferably comprised between 1 hour and 6 hours.

The aforesaid process according to Scheme 2, which comprises the two stages ($b_1$) and ($b_2$), leads to the obtainment of lipophilic copolymers comprising polar multi-blocks having general formula (I), said lipophilic copolymers comprising polar multi-blocks having a star structure, with polymeric arms, in the case in which said at least one polar polyfunctional monomer (iv) is present.

The lipophilic copolymers obtained in stage ($b_1$) have the following characteristics:
- weight average molecular weight ($M_w$) comprised between 1000 g/mol and 200000 g/mol, preferably comprised between 5000 g/mol and 50000 g/mol;
- polydispersity index (PDI), corresponding to the ratio ($M_w/M_n$) between the weight average molecular weight ($M_w$) and the number average molecular weight ($M_n$), lower than 1.7, preferably lower than 1.5.

The lipophilic copolymers comprising polar multi-blocks of general formula (I), having a star structure in the case in which said at least one polar polyfunctional monomer (iv), with polymeric arms and polar multi-blocks, obtained in stage ($b_2$) is present, have the following features:
- weight average molecular weight ($M_w$) comprised between 15000 g/mol and 500000 g/mol, preferably comprised between 40000 g/mol and 300000 g/mol;
- polydispersity index (PDI), corresponding to the ratio ($M_w/M_n$) between the weight average molecular weight ($M_w$) and the number average molecular weight ($M_n$), lower than 2.2, preferably lower than 1.5;
- average number of polymeric arms comprised between 3 and 15, preferably comprised between 3 and 10.

It should be noted that lipophilic copolymers comprising polar multi-blocks having general formula (I), obtained in stage ($b_2$) despite having a lower number of polymeric arms than those obtained in stage ($a_2$), have a higher viscosity since the polar multi-blocks present in said polymeric arms can interact with each other leading to the formation of a reversible percolation network.

The weight average molecular weight ($M_w$) and the number average molecular weight ($M_n$) reported above, were determined by gel permeation chromatography (GPC), operating as reported below in the paragraph "Molecular Characterization".

As said above, said lipophilic copolymer comprising polar multi-blocks having general formula (I), can be advantageously used as an additive capable of improving the viscosity index in lubricating compositions comprising, for example, hydraulic oils, transmission oils, motor oils. In particular, said lipophilic copolymer comprising polar multi-blocks having general formula (I), can be advantageously used in lubricating compositions comprising hydraulic oils or transmission oils. More particularly, said lipophilic copolymer comprising polar multi-blocks having general formula (I), can be advantageously used in lubricating compositions comprising hydraulic oils or transmission oils, thanks to its good thickening capacity, excellent mechanical stability and excellent low temperature properties.

Said lipophilic copolymer comprising polar multi-blocks having general formula (I), is obtained from the process object of the present disclosure, preferably as a solution in a lubricating base oil or in a mixture of lubricating base oils, such as those already described above, the concentration of said lipophilic copolymer comprising polar multi-blocks having general formula (I), in said solution being comprised between 5% by weight and 90% by weight, preferably comprised between 20% by weight and 80% by weight, with respect to the total weight of said solution.

The present disclosure therefore provides a lubricating composition containing at least one lubricating base oil selected from those described above and at least one lipophilic copolymer comprising polar multi-blocks having general formula (I), said lipophilic copolymer comprising polar multi-blocks having general formula (I) being present in said lubricating composition in an amount comprised between 0.2% by weight and 40% by weight, preferably comprised between 1% by weight and 20% by weight, with respect to the total weight of said lubricating composition.

The aforesaid lubricating composition may contain, in addition to said at least one lipophilic copolymer comprising polar multi-blocks having general formula (I), also other additives capable of improving the viscosity index, detergent additives, dispersant additives, antioxidant additives, friction modifier additives, anti-wear and extreme pressure additives (EP additives), corrosion inhibitors, additives to lower the pour point, foam inhibitors, emulsifiers, or mixtures thereof, and the like.

In order to better understand the present disclosure and to put it into practice, some illustrative and non-limiting examples thereof are reported below.

EXAMPLES

The analysis and characterization methods reported below were used.

Molecular Characterization

The monomer conversions were determined by $^1$H-NMR (NMR Bruker 500 Ultrashield Plus spectrometer) by taking a sample before the start of polymerization for each sample and calculating them from the variation of the ratio between the proton signals [—OCH$_2$—] and [—OCH$_3$—] (comprised between 3.6 ppm and 4.5 ppm) and the proton signals [CH$_2$═CX— wherein X═H or CH$_3$](comprised between 5.5 ppm and 6.6 ppm) for the reaction mixture and for the finished sample.

The molecular weights were determined by gel permeation chromatography (GPC) [HPLC Hewlett Packard Series 1100 equipped with Waters Styragel HR3 and HR4 chromatography columns, refractive index detector (RID), solvent used tetrahydrofuran (THF) with a flow of 0.3 ml/min] using a calibration line obtained from polystyrene standards. Through said gel permeation chromatography (GPC) the average number of polymeric arms of the star structure lipophilic copolymer were also determined [through the ratio between the peak molecular weight of the star structure lipophilic copolymer ($M_p$ star) and the peak molecular weight of the polymeric arm ($M_p$ arm)] and the star conversion of the polymeric arm [through the ratio between the area of the integral of the peak molecular weight relative only to the star structure ($I_{star}$) and the area of the integral of the total distribution of the molecular weights of the star structure lipophilic copolymer to be analysed ($I_{arm}$+ $I_{star}$)], as illustrated in FIG. 1.

The weight average molecular weight to be obtained ($M_w$ target) of the polymeric arm of the lipophilic copolymer comprising polar multi-blocks having general formula (I), was determined in accordance with the above reported formula (A).

Example 1-13 (Comparative)

Synthesis of Lipophilic Copolymers Comprising Polar Multi-Blocks by One-Stage Process The preparation of Example 5 is reported in detail.

Methyl methacrylate (MMA) (Aldrich), long chain monomers [dodecyl methacrylate (LMA) and octadecyl methacrylate (SMA)] (Aldrich), the lubricating base oil (ETRO 4) (Petronas), the surfactant Triton® X-100 (polyethylene glycol tert-octyl phenyl ether) (Dow Chemical Company), 2-hydroxyethyl methacrylate (HEMA) (Aldrich) and pentaerythritol tetraacrylate (PETA) (Aldrich) were separately degassed by nitrogen flow for 45 minutes.

Subsequently, it was put in a 250 ml 3-necked flask, equipped with a mechanical stirrer, nitrogen inlet and cooling condenser, as follows (hereinafter MW=molecular weight): 98 g of ETRO 4, 28.6 g of LMA (MW=264.2 g/mol; 0.108 moles), 3.57 g of SMA (MW=316.0 g/mol; $2.25 \times 10^{-2}$ moles), 6.3 g of MMA (MW=100.1 g/mol; $6.29 \times 10^{-2}$ moles), 207 mg of 2-cyano-2-propyl dithiobenzoate (Aldrich) (RAFT) (MW=221.34 g/mol; $9.35 \times 10^{-4}$ moles), 2 g of Triton® X-100 (average MW=625 g/mol; $3.20 \times 10^{-3}$ moles), 4 g of HEMA (MW=130.14 g/mol; $3.07 \times 10^{-2}$ moles) and 370 mg of PETA (MW=352.34 g/mol; $1.05 \times 10^{-3}$ moles): the obtained mixture was left, under stirring, in a nitrogen atmosphere, for 15 minutes. Subsequently, the flask was placed in an oil bath thermostated at a temperature of 95° C. and 90 mg of 2,2'-azobis(2-methyl-butyronitrile) (VAZO™ 67) (DuPont) (MW=192.26 g/mol; $2.34 \times 10^{-4}$ moles) were added to the reaction mixture, in order to initiate the polymerization reaction. After 2 hours, a further 45 mg of VAZO™ 67 (MW=192.26 g/mol; $1.17 \times 10^{-4}$ moles) were added to the reaction mixture, in a nitrogen atmosphere, in order to carry out the finishing of the reaction of polymerization. After a further 1.5 hours, the flask was removed from the oil bath, exposed to the air for the atmospheric oxygen to terminate the polymerization reaction, poured into a suitable container and subjected to characterization by gel permeation chromatography (GPC) and $^1$H-NMR: the results obtained are reported in Table 1.

Figure 2:
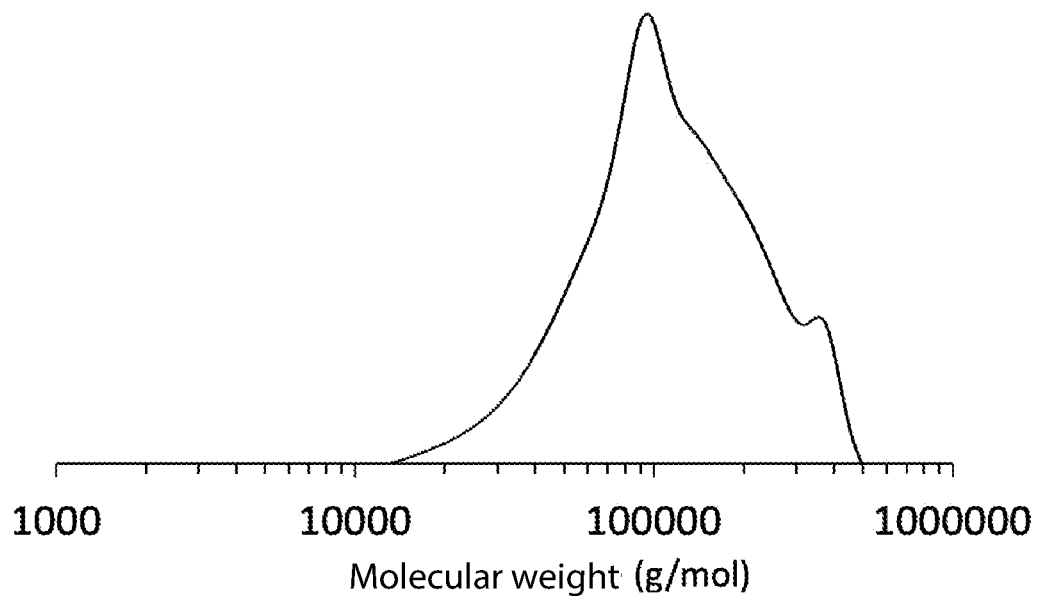

FIG. 2 shows the layout of the gel permeation chromatography (GPC) of the lipophilic copolymer comprising polar multi-blocks obtained in said Example 5.

Examples 1-4 and 6-11 were carried out as described above for Example 5 using the same amounts of lipophilic monomers MMA, LMA and SMA, the same amount of polar monomer HEMA, the same amount of ETRO 4 lubricating base oil, the same amount of Triton X-100 surfactant, while the amounts of VAZO™ 67 and of RAFT were calculated on the basis of the desired weight average molecular weight ($M_w$ target), using the Formula A reported above: with the same weight average molecular weight desired ($M_w$ target), the parameter that has been changed is the amount of the PETA monomer.

Examples 12 and 13 were instead carried out without using RAFT.

In all the examples, the final product obtained was a solution of the lipophilic copolymer containing polar multi-blocks in ETRO 4 lubricating base oil and the amount of said copolymer present in said solution was equal to 32% by weight with respect to the total weight of said solution.

TABLE 1

| | | | | | Conversions by $^1$H-NMR | |
|---|---|---|---|---|---|---|
| Example | $M_w$ target[3] (g/mol) | final $M_w$[4] (g/mol) | final PDI[5] | PETA[2] (% by weight) | MMA[1]- LMA[1]- SMA[1] (%) | HEMA[2] (%) | PETA[2] (%) |
| 1 | 50000 | 209800 | 2.1 | 0.25 | 88.3 | >99 | >99 |
| 2 | 50000 | 335000 | 2.5 | 0.30 | 89.0 | >99 | >99 |
| 3 | 50000 | 440500 | 2.6 | 0.40 | 75.2 | >99 | >99 |
| 4 | 50000 | 439500 | 2.5 | 0.50 | 66.8 | 82.4 | >99 |
| 5 | 30000 | 137400 | 1.5 | 0.25 | 93.4 | >99 | >99 |
| 6 | 30000 | 230900 | 1.9 | 0.30 | 94.1 | 98.6 | >99 |
| 7 | 30000 | 332000 | 2.7 | 0.40 | 92.7 | >99 | >99 |
| 8 | 30000 | 389600 | 2.5 | 0.50 | 87.1 | 98.2 | >99 |
| 9 | 15000 | 71100 | 1.5 | 0.25 | 98.4 | >99 | >99 |
| 10 | 15000 | 169600 | 2.3 | 0.50 | 96.8 | >99 | >99 |
| 11 | 15000 | 247800 | 2.5 | 1.01 | 54.7 | 90.7 | >99 |
| 12 | 30000 | n.d.[6] | n.d.[6] | 0.50 | n.d.[6] | n.d.[6] | n.d.[6] |
| 13 | 15000 | n.d.[6] | n.d.[6] | 0.50 | n.d.[6] | n.d.[6] | n.d.[6] |

[1]lipophilic monomers;
[2]polar monomers;
[3]weight average molecular weight of the lipophilic copolymer comprising polar multi-blocks to be obtained;
[4]weight average molecular weight of the lipophilic copolymer comprising polar multi-blocks obtained;
[5]polydispersity index (PDI), corresponding to the ratio ($M_w/M_n$) between the weight average molecular weight ($M_w$) and the number average molecular weight ($M_n$) of the obtained lipophilic copolymer comprising polar multi-blocks;
[6]not determined.

Examples 14-22

Synthesis of Star Structure Lipophilic Copolymers Comprising Polar Multi-Blocks by Two-Stage Process [Stage ($a_1$) and Stage ($a_2$)] Illustrated in Scheme 1

The preparation of Example 14 is reported in detail.

Stage ($a_1$)

Methyl methacrylate (MMA) (Aldrich), long chain monomers [dodecyl methacrylate (LMA) and octadecyl methacrylate (SMA)] (Aldrich), the lubricating base oil (ETRO 4) (Petronas), the surfactant Triton® X-100 (polyethylene glycol tert-octyl phenyl ether) (Dow Chemical Company), 2-hydroxyethyl methacrylate (HEMA) (Aldrich) and pentaerythritol tetraacrylate (PETA) (Aldrich) were separately degassed by nitrogen flow for 45 minutes.

Subsequently, it was put in a 250 ml 3-necked flask, equipped with a mechanical stirrer, nitrogen inlet and cooling condenser, as follows: 83 g of ETRO 4 lubricating base oil, 28.6 g of LMA (MW=264.2 g/mol; 0.108 moles), 3.57 g of SMA (MW=316.0 g/mol; $2.25 \times 10^{-2}$ moles), 6.3 g of MMA (MW=100.1 g/mol; $6.29 \times 10^{-2}$ moles), 207 mg of 2-cyano-2-propyl dithiobenzoate (Aldrich) (RAFT) (MW=221.34 g/mol; $9.35 \times 10^{-4}$ moles): the obtained mixture was left, under stirring, in a nitrogen atmosphere, for 15 minutes. Subsequently, the flask was placed in an oil bath thermostated at a temperature of 95° C. and 90 mg of 2,2'-azobis(2-methyl-butyronitrile) (VAZO™ 67) (DuPont) (MW=192.26 g/mol; $2.34 \times 10^{-4}$ moles) were added to the reaction mixture, in order to initiate the polymerization reaction.

Stage ($a_2$)

After 1 hour and 45 minutes, an emulsion containing 15 g of ETRO 4, 2 g of Triton® X-100 (average MW=625 g/mol; $3.2 \times 10^{-3}$ moles), 4 g of HEMA (MW=130.14 g/mol; $3.07 \times 10^{-2}$ moles) and 370 mg of PETA (MW=352.34 g/mol; $1.05 \times 10^{-3}$ moles) and 23 mg of VAZO™ 67 (MW=192.26 g/mol; $1.2 \times 10^{-4}$ moles), previously degassed and mixed for 45 minutes, were added to the reaction mixture obtained in Stage ($a_1$) in a nitrogen atmosphere. After a further 4 hours, the flask was removed from the oil bath, exposed to the air for the atmospheric oxygen to terminate the polymerization reaction, poured into a suitable container and subjected to a gel permeation chromatography (GPC) and $^1$H-NMR: the results obtained are reported in Table 2.

Figure 3:
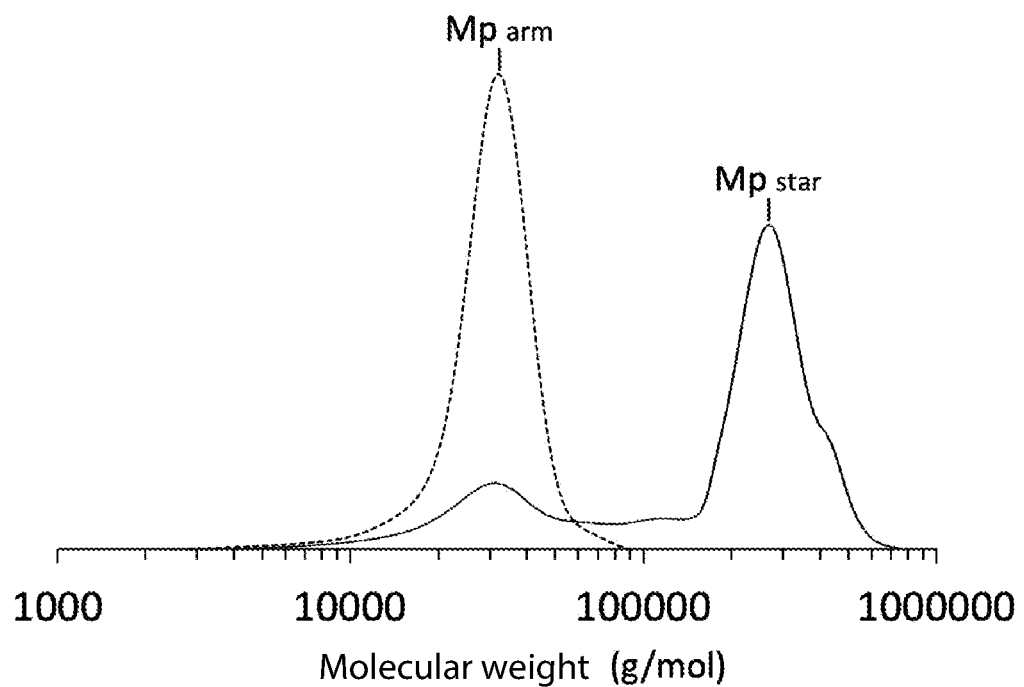

FIG. 3 shows the layout of the gel permeation chromatography (GPC) of the lipophilic copolymer comprising polar multi-blocks obtained in said Example 15: the continuous layout is related to the star structure copolymer comprising polar multi-blocks (Mp star) obtained in stage ($a_2$); the dashed trace is related to the copolymer comprising polar multi-blocks (Mp arm) obtained in stage ($a_1$).

Examples 15-19 were carried out as described above for Example 14 using the same amounts of lipophilic monomers MMA, LMA and SMA, the same amount of polar monomer HEMA, the same amount of ETRO 4 lubricating base oil, the same amount of Triton X-100 surfactant, while the amounts of VAZO™ 67 and of RAFT were calculated on the basis of the desired weight average molecular weight (target $M_w$ target), using the Formula A reported above: with the same average molecular weight desired weight (target $M_w$), the parameter that has been changed is the amount of the PETA monomer.

Examples 20, 21 and 22, on the other hand, were carried out using 646 mg of 2-cyano-2-propyl dodecyl trithiocarbonate (Aldrich) (RAFT) (MW=345.63 g/mol; $1.87 \times 10^{-3}$ moles), instead of 2-cyano-2-propyl dithiobenzoate (RAFT).

In all the examples, the final product obtained was a solution of the lipophilic copolymer containing polar multi-blocks with a mainly star structure in ETRO 4 lubricating base oil and the amount of said copolymer present in said solution was equal to 32% by weight with respect to the total weight of said solution.

TABLE 2

| | | | | GPC analysis | | | | | | | Conversions by $^1$H-NMR | | |
|---|---|---|---|---|---|---|---|---|---|---|---|---|---|
| EXAMPLE | RAFT | $M_w$ target[3] (g/mol) | PETA[5] (% by weight) | $M_p$ arm[6] (g/mol) | $M_w$ arm[11] (g/mol) | PDI arm[7] | $M_p$ star[8] | $M_w$ star[12] (g/mol) | PDI star[9] | Average number of arms | Star conversion[10] | MMA[4]-LMA[4]-SMA[4] (%) | HEMA[5] (%) | PETA[5] (%) |
| 14 | DB[1] | 30000 | 0.25 | 27900 | 27500 | 1.14 | 232800 | 204200 | 1.22 | 8.4 | 68.6 | 93.8 | 98.3 | >99 |
| 15 | DB[1] | 30000 | 0.50 | 32000 | 31500 | 1.16 | 268600 | 278700 | 1.15 | 8.4 | 76.4 | 93.1 | 98.9 | >99 |
| 16 | DB[1] | 30000 | 0.75 | 31500 | 30500 | 1.2 | 293900 | 318800 | 1.2 | 9.3 | 79.7 | 94.2 | >99 | >99 |
| 17 | DB[1] | 15000 | 0.25 | 19100 | 18900 | 1.13 | 205200 | 226700 | 1.35 | 10.7 | 74.9 | 97.8 | >99 | >99 |
| 18 | DB[1] | 15000 | 0.50 | 19500 | 19200 | 1.13 | 199400 | 199800 | 1.08 | 10.2 | 73.8 | 96.7 | >99 | >99 |
| 19 | DB[1] | 15000 | 1.01 | 18200 | 18000 | 1.12 | 178600 | 183000 | 1.08 | 9.8 | 79.5 | 96.7 | >99 | >99 |
| 20 | TTC[2] | 15000 | 0.25 | 22400 | 22000 | 1.23 | 280900 | 337800 | 1.46 | 12.5 | 31.4 | 99.0 | 98.8 | >99 |
| 21 | TTC[2] | 15000 | 0.50 | 21300 | 21100 | 1.22 | 242500 | 326100 | 1.24 | 11.4 | 36.5 | 96.6 | >99 | >99 |
| 22 | TTC[2] | 15000 | 1.01 | 22200 | 21700 | 1.21 | 219900 | 242700 | 1.37 | 9.9 | 60.8 | 97.1 | >99 | >99 |

[1]2-cyano-2-propyl dithiobenzoate;
[2]2-cyano-2-propyl dodecyl trithiocarbonate;
[3]weight average molecular weight to be obtained for the polymeric arm of the star structure lipophilic copolymer comprising polar multi-blocks;
[4]lipophilic monomers;
[5]polar monomers;
[6]peak molecular weight of the polymeric arm of the star structure lipophilic copolymer obtained comprising polar multi-blocks;
[7]polydispersity index (PDI) corresponding to the ratio ($M_w/M_n$) between the weight average molecular weight ($M_w$) and the number average molecular weight ($M_n$) of the polymeric arm of the obtained star structure lipophilic copolymer comprising polar multi-blocks;
[8]peak molecular weight of the star structure lipophilic copolymer obtained comprising polar multi-blocks;
[9]polydispersity index (PDI) corresponding to the ratio ($M_w/M_n$) between the weight average molecular weight ($M_w$) and the number average molecular weight ($M_n$) of the lipophilic copolymer comprising polar multi-blocks obtained;
[10]star conversion of the polymeric arm;
[11]weight average molecular weight of the polymeric arm of the star structure lipophilic copolymer obtained comprising polar multi-blocks;
[12]weight average molecular weight of the star structure lipophilic copolymer obtained comprising polar multi-blocks.

Examples 23-35

Synthesis of Star Structure Lipophilic Copolymers Comprising Polar Multi-Blocks by Two-Stage Process [Stage ($b_1$) and Stage ($b_2$)]

The preparation of Example 24 is reported in detail.

Stage ($b_1$)

Methyl methacrylate (MMA) (Aldrich), long chain monomers [dodecyl methacrylate (LMA) and octadecyl methacrylate (SMA)] (Aldrich), the lubricating base oil (ETRO 4) (Petronas), the surfactant Triton® X-100 (polyethylene glycol tert-octyl phenyl ether) (Dow Chemical Company), 2-hydroxyethyl methacrylate (HEMA) (Aldrich) and pentaerythritol tetraacrylate (PETA) (Aldrich) were separately degassed by nitrogen flow for 45 minutes.

Subsequently, it was put in a 250 ml 3-necked flask, equipped with a mechanical stirrer, nitrogen inlet and cooling condenser, as follows: 88 g of ETRO 4 lubricating base oil, 28.6 g of LMA (MW=264.2 g/mol; 0.108 moles), 3.57 g of SMA (MW=316.0 g/mol; $2.25 \times 10^{-2}$ moles), 6.3 g of MMA (MW=100.1 g/mol; $6.29 \times 10^{-2}$ moles), 207 mg of 2-cyano-2-propyl dithiobenzoate (Aldrich) (RAFT) (MW=221.34 g/mol; $9.35 \times 10^{-4}$ moles), 1.5 g of Triton® X-100 (average MW=625 g/mol; $2.40 \times 10^{-3}$ moles) and 3 g of HEMA (MW=130.14 g/mol; $2.31 \times 10^{-2}$ moles): the mixture obtained was left, under stirring, in a nitrogen atmosphere, for 15 minutes. Subsequently, the flask was placed in an oil bath thermostated at a temperature of 95° C. and 90 mg of 2,2'-azobis (2-methyl-butyronitrile) (VAZO™ 67) (DuPont) (MW=192.26 g/mol; $4.68 \times 10^{-4}$ moles) was added to the reaction mixture, in order to initiate the polymerization reaction.

Stage ($b_2$)

After 1 hour and 45 minutes, an emulsion containing 10 g of ETRO 4, 0.5 g of Triton® X-100 (average MW=625 g/mol; $8.00 \times 10^{-4}$ moles), 1 g of HEMA (MW=130.14 g/mol; $7.68 \times 10^{-3}$ moles) and 370 mg of PETA (MW=352.34 g/mol; $1.05 \times 10^{-3}$ moles) and 23 mg of VAZO™ 67 (MW=192.26 g/mol; $1.2 \times 10^{-4}$ moles), previously degassed and mixed for 45 minutes, were added to the reaction mixture obtained in Stage ($b_1$) in a nitrogen atmosphere. After a further 4 hours, the flask was removed from the oil bath, exposed to the air for the atmospheric oxygen to terminate the polymerization reaction, poured into a suitable container and subjected to a gel permeation chromatography (GPC) and $^1$H-NMR: the results obtained are reported in Table 3.

Figure 4:
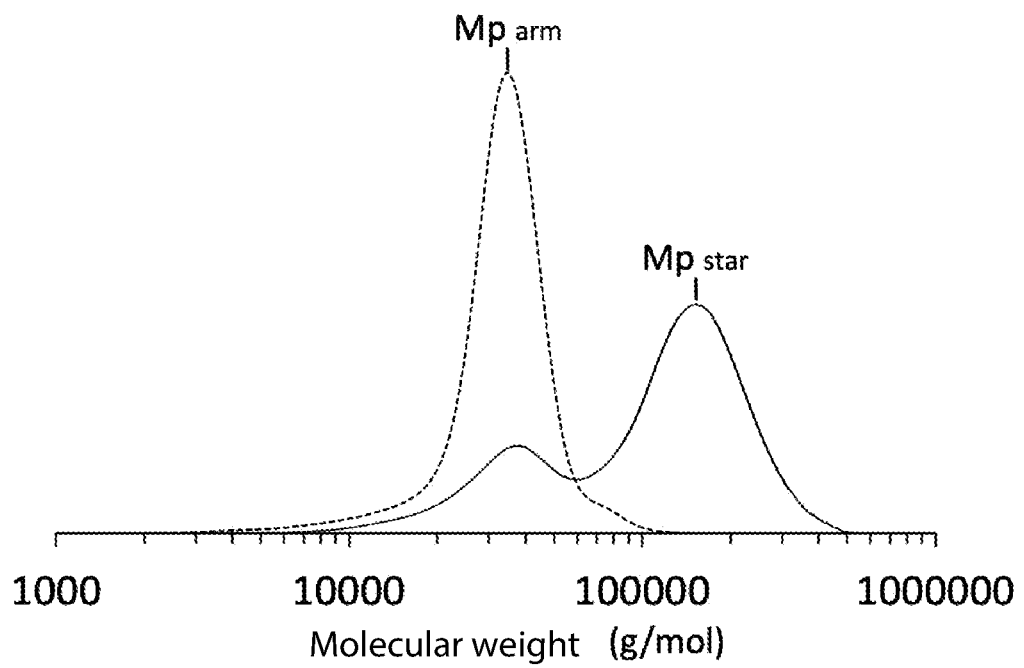

FIG. 4 shows the gel permeation chromatography (GPC) of the lipophilic copolymer comprising polar multi-blocks obtained in said Example 24: the continuous trace is related to the star structure copolymer comprising polar multi-blocks ($M_p$ star) obtained in stage ($b_2$); the dashed trace is related to the copolymer comprising polar multi-blocks ($M_p$ arm) obtained in stage ($b_1$).

Examples 23 and 25-28 were carried out as described above for Example 24 using the same amounts of lipophilic monomers MMA, LMA and SMA, the same amount of polar monomer HEMA, the same amount of ETRO 4 lubricating base oil, the same amount of Triton X-100 surfactant, while the amounts of VAZO™ 67 and of RAFT were calculated on the basis of the desired weight average molecular weight ($M_w$ target), using the Formula A reported above: with the same desired weight average molecular weight ($M_w$ target), the parameter that has been changed is the amount of the PETA monomer.

Examples 29 and 30, on the other hand, were carried out using 646 mg of 2-cyano-2-propyl dodecyl trithiocarbonate (Aldrich) (RAFT) (MW=345.63 g/mol; $1.87 \times 10^{-3}$ moles), instead of 2-cyano-2-propyl dithiobenzoate (RAFT).

Example 31 was instead carried out using 4.25 mg of Eni MX 3280 surfactant (calcium dialkylbenzene sulfonate) (Eni), 45% by weight in Eni SN 150 lubricating base oil (average MW=968.1 g/mol; $1.97 \times 10^{-3}$ moles) instead of Triton® X-100.

Example 32 was instead carried out using 324 mg of N,N'-bis-methylene bis-acrylamide (BAAm) (Aldrich) (MW=154.17 g/mol; $2.1 \times 10^{-3}$ moles) instead of PETA.

Example 35 was instead carried out using 1.69 mg of 2,2'-bis [4-(methacryloxy-polyethoxy)-phenyl]-propane [u+v=10 in the general formula (IX)] (Aldrich) (MW=804 g/mol; $2.1 \times 10^{-3}$ moles) instead of PETA.

Examples 33 and 34, on the other hand, were carried out using a different amount of HEMA (see Table 3).

In all the examples, the final product obtained was a solution of the star structure lipophilic copolymer containing polar multi-blocks in ETRO 4 lubricating base oil and the amount of said copolymer present in said solution was equal to 32% by weight with respect to the total weight of said solution.

TABLE 3

| EXAMPLE | HEMA (% by weight) | $M_w$ target[3] (g/mol) | Polyfunctional polar monomer (% by weight) | GPC analysis | | | | | | Average number of arms | Star conversion[10] | Conversions by $^{-1}$H-NMR | | |
|---|---|---|---|---|---|---|---|---|---|---|---|---|---|---|
| | | | | $M_p$ arm[6] (g/mol) | $M_w$ arm[11] (g/mol) | PDI arm[7] | $M_p$ star[8] | $M_w$ star[12] (g/mol) | PDI star[9] | | | MMA[4]-LMA[4]-SMA[4] (%) | HEMA[5] (%) | PETA[5] (%) |
| 23 | 8.7 | 30000 | 0.25 | 31500 | 31800 | 1.18 | 107600 | 86800 | 1.32 | 3.4 | 78.4 | 94.1 | 98.5 | >99 |
| 24 | 8.7 | 30000 | 0.50 | 34700 | 35100 | 1.21 | 152300 | 161800 | 1.18 | 4.4 | 74.4 | 95.6 | 98.9 | >99 |
| 25 | 8.7 | 30000 | 0.75 | 35700 | 35800 | 1.19 | 180000 | 167900 | 1.21 | 5.0 | 79.4 | 96.1 | >99 | >99 |
| 26 | 8.7 | 15000 | 0.25 | 19800 | 15500 | 1.15 | 90300 | 77000 | 1.18 | 4.6 | 71.1 | 97.9 | 98.9 | >99 |
| 27 | 8.7 | 15000 | 0.50 | 22800 | 22300 | 1.18 | 118700 | 108900 | 1.22 | 5.2 | 76.5 | 97.3 | >99 | >99 |
| 28 | 8.7 | 15000 | 1.01 | 21200 | 20900 | 1.17 | 119700 | 114000 | 1.23 | 5.6 | 80.9 | 97.8 | >99 | >99 |
| 29 | 8.7 | 15000 | 0.25 | 23800 | 24000 | 1.25 | 54200 | 79700 | 1.22 | 2.3 | 65.6 | 97.8 | 98.5 | >99 |
| 30 | 8.7 | 15000 | 0.50 | 24200 | 24400 | 1.25 | 98800 | 94700 | 1.25 | 4.1 | 72.2 | 98.1 | >99 | >99 |
| 31 | 8.7 | 15000 | 1.01 | 21600 | 32000 | 1.45 | 197100 | 256000 | 1.85 | 9.1 | 85.4 | 97.7 | >99 | >99 |
| 32 | 8.7 | 15000 | 0.25 | 21200 | 21000 | 1.15 | 47600 | 66700 | 1.15 | 2.2 | 58.3 | 97.5 | >99 | >99 |
| 33 | 4.3 | 15000 | 0.50 | 20900 | 20500 | 1.15 | 113700 | 100000 | 1.21 | 5.4 | 97.3 | 97.3 | 97.8 | >99 |
| 34 | 17.4 | 15000 | 0.75 | 22000 | 23000 | 1.18 | 99400 | 90700 | 1.23 | 4.5 | 97.6 | 97.6 | >99 | >99 |
| 35 | 8.7 | 15000 | 0.25 | 21200 | 20600 | 1.15 | 175100 | 160400 | 1.09 | 8.3 | 97.5 | 97.5 | >99 | >99 |

[3]weight average molecular weight to be obtained for the polymeric arm of the star structure lipophilic copolymer comprising polar multi-blocks;
[4]lipophilic monomers;
[5]polar monomers;
[6]peak molecular weight of the polymeric arm of the star structure lipophilic copolymer obtained comprising polar multi-blocks;
[7]polydispersity index (PDI) corresponding to the ratio ($M_w/M_n$) between the weight average molecular weight ($M_w$) and the number average molecular weight ($M_n$) of the polymeric arm of the obtained star structure lipophilic copolymer comprising polar multi-blocks;
[8]peak molecular weight of the star structure lipophilic copolymer obtained comprising polar multi-blocks;
[9]polydispersity index (PDI) corresponding to the ratio ($M_w/M_n$) between the weight average molecular weight ($M_w$) and the number average molecular weight ($M_n$) of the lipophilic copolymer comprising polar multi-blocks obtained;
[10]star conversion of the polymeric arm;
[11]weight average molecular weight of the polymeric arm of the star structure lipophilic copolymer obtained comprising polar multi-blocks;
[12]weight average molecular weight of the star structure lipophilic copolymer obtained comprising polar multi-blocks.

Example 36-59

Lubricating Compositions Containing Lipophilic Copolymers Containing Polar Multi-Groups The lubricating compositions for applications such as hydraulic oils have been prepared by mixing the lipophilic copolymers containing polar multi-groups obtained in the examples reported above with a mixture of mineral lubricating base oils belonging to Group I (API classification): said lubricating compositions also contain a package of additives.

Lipophilic copolymers containing polar multi-groups were added as a solution in ETRO 4 base oil at a concentration of 32% by weight, as they were obtained in the examples above reported (the numbers of the examples are reported in Tables 4-6 below). The solutions of the various lipophilic copolymers containing polar multi-groups have been added in such an amount as to obtain lubricating compositions with a kinematic viscosity value ("Kinematic Viscosity"—KV), at 40° C., of about 46 mm$^2$/s.

The kinematic viscosity (KV), at 40° C. and 100° C., was determined by the ASTM D445-18 method.

The viscosity index (VI) was determined by the ASTM D2270-10 (2016) method.

The Pour Point was determined by the ASTM D97-17b method.

The lubricating compositions were also subjected to the KRL test (CEC L-45-A-99) for the evaluation of the mechanical shear stability of the lipophilic copolymers containing polar multi-groups contained therein, using an apparatus equipped with a rotating bearing immersed in the lubricating composition to be analysed. The test was carried out for 20 hours with a load of 5000 N, at a temperature of 40° C. and at 1450 rpm. The kinematic viscosity data at 100° C. of the oil, before the KRL test and after the test, were determined by the ASTM D445-18 method. The KRL test delivers as a result the percentage of loss of the kinematic viscosity measured at 100° C.

The data obtained from the analyses carried out are reported in Tables 4, 5 and 6. In particular:
- Table 4 shows the data obtained from the carried out analyses of the lubricating compositions containing the lipophilic copolymers containing polar multi-groups obtained through the one-stage process (comparative);
- Table 5 shows the data obtained from the carried out analyses of the lubricating compositions containing the star structure lipophilic copolymers containing polar multi groups obtained through the two-stage process [stage ($a_1$) and stage ($a_2$)];
- Table 6 shows the data obtained from the carried out analyses of the lubricating compositions containing the star structure lipophilic copolymers containing polar multi groups obtained through the two-stage process [stage ($b_1$) and stage ($b_2$)].

From the data reported in Tables 4, 5 and 6, it can be deduced that the lubricating compositions containing the lipophilic copolymers containing polar multi-groups obtained in Examples 1-13 (comparative) show a greater loss of viscosity with respect to the lubricating compositions containing the star structure lipophilic copolymers containing polar multi-groups obtained in Examples 15-22 and 23-35 according to the present disclosure. Said behaviour is particularly clear when comparing the results of Example 41 (comparative) with those of Examples 48 (disclosure), 49 (disclosure), 50 (disclosure), 54 (disclosure), 55 (disclosure), and 56 (disclosure): in the latter examples, with a lower copolymer content than in Example 41 (comparative), a better thickening capacity and a lower viscosity loss at the KRL test and therefore a better mechanical shear stability are obtained.

TABLE 4

| EXAMPLE | COPOLYMER EXAMPLE | COPOLYMER SOLUTION CONTENT (% m/m) | COPOLYMER CONTENT (% m/m) | KINEMATIC VISCOSITY ANALYSIS (KV) | | | POUR POINT (° C.) | VISCOSITY LOSS AFTER KRL TEST (%) |
|---|---|---|---|---|---|---|---|---|
| | | | | 40° C. (mm$^2$/s) | 100° C. (mm$^2$/s) | VISCOSITY INDEX (VI) | | |
| 36 (comparative) | 1 | 4.3 | 1.38 | 44.35 | 8.19 | 161 | −36 | 27.7 |
| 37 (comparative) | 5 | 11.7 | 3.74 | 46.82 | 8.54 | 161 | −36 | 21.3 |
| 38 (comparative) | 6 | 6 | 1.92 | 44.46 | 8.02 | 154 | −36 | 23.1 |
| 39 (comparative) | 7 | 4 | 1.28 | 47.43 | 9.11 | 177 | −36 | 36.5 |
| 40 (comparative) | 8 | 3.8 | 1.22 | 45.26 | 8.49 | 167 | −36 | 31.8 |
| 41 (comparative) | 9 | 18 | 5.76 | 46.47 | 8.3 | 155 | −39 | 12.1 |
| 42 (comparative) | 10 | 8 | 2.56 | 50.25 | 9.41 | 174 | −39 | 31.5 |
| 43 (comparative) | 12 | 5 | 1.6 | LITTLE SOLUBLE IN OIL, CROSS-LINKED COPOLYMER | | | — | — |
| 44 (comparative) | 13 | 5 | 1.6 | LITTLE SOLUBLE IN OIL, CROSS-LINKED COPOLYMER | | | — | — |

TABLE 5

| EXAMPLE | COPOLYMER EXAMPLE | COPOLYMER SOLUTION CONTENT (% m/m) | COPOLYMER CONTENT (% m/m) | KINEMATIC VISCOSITY ANALYSIS (KV) | | | POUR POINT (° C.) | VISCOSITY LOSS AFTER KRL TEST (%) |
|---|---|---|---|---|---|---|---|---|
| | | | | 40° C. ($mm^2$/s) | 100° C. ($mm^2$/s) | VISCOSITY INDEX (VI) | | |
| 45 | 14 | 13.18 | 4.21 | 45.76 | 8.22 | 155 | −36 | 15.3 |
| 46 | 15 | 12 | 3.84 | 46.35 | 8.29 | 155 | −36 | 18.7 |
| 47 | 16 | 10.5 | 3.36 | 44.71 | 8.03 | 154 | −36 | 17.1 |
| 48 | 17 | 16.06 | 5.13 | 44.62 | 7.91 | 150 | −39 | 8 |
| 49 | 18 | 14 | 4.48 | 43.78 | 7.63 | 144 | −39 | 6.5 |
| 50 | 19 | 15.4 | 4.92 | 45.32 | 7.98 | 149 | −39 | 8.1 |

TABLE 6

| EXAMPLE | COPOLYMER EXAMPLE | COPOLYMER SOLUTION CONTENT (% m/m) | COPOLYMER CONTENT (% m/m) | KINEMATIC VISCOSITY ANALYSIS (KV) | | | POUR POINT (° C.) | VISCOSITY LOSS AFTER KRL TEST (%) |
|---|---|---|---|---|---|---|---|---|
| | | | | 40° C. ($mm^2$/s) | 100° C. ($mm^2$/s) | VISCOSITY INDEX (VI) | | |
| 51 | 23 | 15.39 | 4.92 | 44.99 | 8.21 | 159 | −39 | 13.1 |
| 52 | 24 | 11.5 | 3.68 | 44.99 | 8.08 | 154 | −39 | 15.8 |
| 53 | 25 | 11.5 | 3.68 | 45.95 | 8.23 | 155 | −39 | 16.5 |
| 54 | 26 | 16 | 5.12 | 43.18 | 7.65 | 147 | −39 | 7 |
| 55 | 27 | 14 | 4.48 | 43.50 | 7.7 | 147 | −39 | 6.6 |
| 56 | 28 | 13.5 | 4.32 | 43.24 | 7.65 | 146 | −39 | 8.4 |
| 57 | 33 | 18 | 5.76 | 45.24 | 8.01 | 153 | −39 | 8.8 |
| 58 | 34 | 14.4 | 4.61 | 47.06 | 8.25 | 151 | −39 | 19.1 |
| 59 | 31 | 8 | 2.56 | 45.06 | 8.09 | 154 | −39 | 20.3 |

The invention claimed is:

1. A lipophilic copolymer comprising polar multi-blocks having general formula (I):

$$[(B_yA_k)_s]_t(A_jC_m) \quad (I)$$

wherein:
B represents at least one monomer unit deriving from a lipophilic monomer having general formula (II):

wherein:
X represents a hydrogen atom; or a methyl group;
R is selected from $C_1$-$C_{50}$ alkyl groups, linear or branched;
A represents at least one monomer unit deriving from a polar monomer selected from:
(a) compounds having general formula (III):

wherein X represents a hydrogen atom or a methyl group and n represents an integer from 0 to 4;
(b) (meth)acrylamide or (meth)acrylamides substituted on the nitrogen atom with one or two $C_1$-$C_4$ alkyl groups, linear or branched, said alkyl groups optionally containing polar functional groups;
(c) di-($C_1$-$C_4$)-alkylamino-($C_1$-$C_4$)-alkyl (meth)acrylates;
C represents at least one monomer unit deriving from a polar polyfunctional monomer having general formula (IV):

$$Z\text{—}(W)_p \quad (IV)$$

wherein:
Z represents a group containing carbon, hydrogen and, optionally, oxygen;
W represents a function able to react covalently with an alkyl radical;
p is an integer or fractional number from 2 to 8;
y is an integer or fractional number from 2 to 250;
k is an integer or fractional number from 0 to 90;
j is an integer or fractional number from 0 to 8;
m is an integer or fractional number from 2 to 10;
s is an integer or fractional number from 1 to 20;
t is an integer or fractional number from 3 to 20;
provided that at least one between j and k is different from 0.

2. The lipophilic copolymer comprising polar multi-blocks according to claim 1, wherein in said general formula (I):
B represents at least one monomer unit deriving from a lipophilic monomer having general formula (II)

selected from the group consisting of: methyl methacrylate (X=CH$_3$ and R=CH$_3$), medium-chain alkyl methacrylates (X=CH$_3$ and R=C$_{12}$H$_{25}$-C$_{15}$H$_{31}$); long-chain alkyl methacrylates (X=CH$_3$ and R=C$_{16}$H$_{33}$-C$_{18}$H$_{37}$), longer-chain alkyl methacrylates (X=CH$_3$ and R=C$_{18}$H$_{37}$-C$_{22}$H$_{45}$); or mixtures thereof.

3. The lipophilic copolymer comprising polar multi-blocks according to claim 1, wherein in said general formula (I):
A represents at least one monomer unit deriving from a polar monomer selected from the group consisting of:
  (a) compounds having general formula (III) selected from: acrylic acid (X=H and n=0), methacrylic acid (X=CH$_3$ and n=0), hydroxyethyl acrylate (X=H and n=1), hydroxyethyl methacrylate (X=CH$_3$, n=1); or mixtures thereof;
  (b) acrylamide, methacrylamide, N-iso-propyl-acrylamide, 2-hydroxy-propyl methacrylamide, N-[3-(di-methyl-amino)-propyl-methacrylamide, or mixtures thereof;
  (c) 2-(dimethyl-amino)-ethyl methacrylate, 2-(diethyl-amino)-ethyl methacrylate, 2-(dimethyl-amino)-ethyl acrylate, or mixtures thereof.

4. The lipophilic copolymer comprising polar multi-blocks according to claim 1, wherein in said general formula (I):
C represents at least one monomer unit deriving from a polar polyfunctional monomer selected from the group consisting of:
  (a') polyvalent methacrylic monomers having general formula (V)

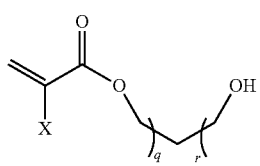

(V)

wherein q+r=4, q>1, r<3, and X represents a hydrogen atom or a methyl group;
  (b') polyethylene glycols di-(meth)acrylates having general formula (VI):

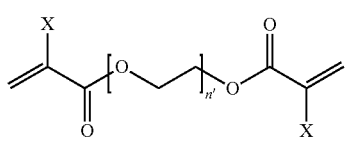

(VI)

wherein n' is an integer from 1 to 10, and X represents a hydrogen atom or a methyl group;
  (c') polyfunctional acrylamides having general formula (VII):

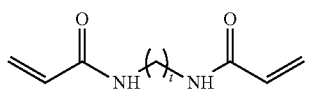

(VII)

wherein t is an integer from 1 to 4;
  (d') calixarenes having general formula (VIII):

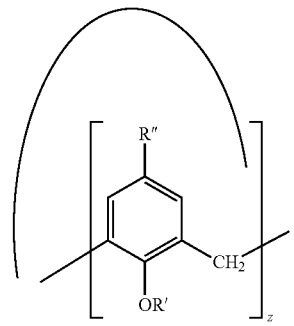

(VIII)

wherein R' represents a group having formula (VIIIa):

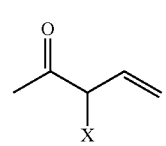

(VIIIa)

wherein X represents a hydrogen atom or a methyl group and R" represents a hydrogen atom, or is selected from C$_1$-C$_{40}$ alkyl groups, linear or branched, z is an integer from 4 to 16;
  (e') 2,2'-bis-[4-(methacryloxy-polyethoxy)-phenyl]-propanes having general formula (IX):

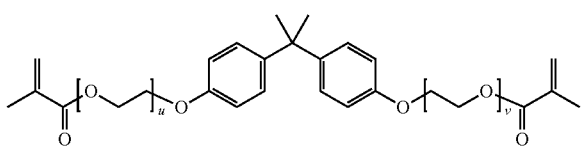

(IX)

wherein u and v are integers from 1 to 10.

5. The lipophilic copolymer comprising polar multi-blocks according to claim 4, wherein in said general formula (I):
C represents at least one monomer unit deriving from a polar polyfunctional monomer selected from the group consisting of:
  (a') polyvalent methacrylic monomers having general formula (V) selected from: pentaerythritol tetra-acrylate (q=4; r=0), pentaerythritol tri-acrylate (q=3; r=1);
  (b') polyethylene glycol di-(meth)acrylate [n=1 in the general formula (VI)];
  (c') N,N'-methylene-bis-acrylamide [t=1 in the general formula (VII)];

(d') calixarenes having general formula (VIII) wherein R' represents a group having formula (VIIIa):

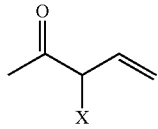

(VIIIa)

wherein X represents a methyl group and R" is selected from $C_8$-$C_{18}$ alkyl group, linear or branched, z is an integer from 4 to 8;
(e') 2,2'-bis-[4-(methacryloxy-polyethoxy)-phenyl]-propane [u+v=10 in the general formula (IX)].

6. The lipophilic copolymer comprising polar multi-blocks according to claim 1, wherein in said general formula (I):

B represents at least one monomer unit deriving from methyl methacrylate, at least one monomer unit deriving from dodecyl methacrylate and at least one monomer unit deriving from octadecyl methacrylate, with a random or block structure;
A represents at least one monomer unit deriving from 2-hydroxyethyl methacrylate;
C represents at least one monomer unit deriving from pentaerythritol tetra-acrylate, or at least one monomer unit deriving from N,N'-bis-methylene-bis-acrylamide; or at least one monomer unit deriving from 2,2'-bis [4-(methacryloxy-polyethoxy)-phenyl]-propane [u+v=10 in the general formula (IX)];

the values of y, k, j m, s and t, depending on the amount and monomers used, as well as the process used to obtain said lipophilic copolymer comprising polar multi-blocks having general formula (I), at least one between j and k being different from 0.

* * * * *